(12) United States Patent
Lund

(10) Patent No.: US 11,565,595 B2
(45) Date of Patent: Jan. 31, 2023

(54) FILTER CIRCUIT ARRANGEMENT, AN ELECTRIC VEHICLE AND A METHOD OF OPERATING AN ELECTRIC VEHICLE

(71) Applicant: Bombardier Primove GmbH, Berlin (DE)

(72) Inventor: Stephen Lund, Sennwald (CH)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 17/414,509

(22) PCT Filed: Dec. 16, 2019

(86) PCT No.: PCT/EP2019/085366
§ 371 (c)(1),
(2) Date: Jun. 16, 2021

(87) PCT Pub. No.: WO2020/127063
PCT Pub. Date: Jun. 25, 2020

(65) Prior Publication Data
US 2022/0063427 A1    Mar. 3, 2022

(30) Foreign Application Priority Data

Dec. 18, 2018 (GB) .................................. 1820591.4

(51) Int. Cl.
*H02J 50/12* (2016.01)
*B60L 53/12* (2019.01)

(52) U.S. Cl.
CPC .............. *B60L 53/12* (2019.02); *H02J 50/12* (2016.02)

(58) Field of Classification Search
CPC ........ B60L 53/12; B60L 53/122; B60L 53/22; B60L 3/0046; B60L 3/0084; B60L 50/51;
(Continued)

(56) References Cited

U.S. PATENT DOCUMENTS

| 7,027,314 B2 * | 4/2006 | Soto ..................... H02M 1/126 363/39 |
| 8,115,444 B2 * | 2/2012 | De ........................ H02M 5/458 318/803 |
| 2003/0218889 A1 | 11/2003 | Soto et al. |
| 2011/0130906 A1 | 6/2011 | Mayer |
| 2011/0234337 A1 * | 9/2011 | Saitou .................... H03H 7/427 333/175 |

(Continued)

FOREIGN PATENT DOCUMENTS

CN  202978843 U  *  6/2013
CN  107332434 A  *  11/2017  ............ H02M 1/126

(Continued)

OTHER PUBLICATIONS

International Search Report and Written Opinion dated Feb. 28, 2020, in connection with PCT/EP2019/085366 filed Dec. 16, 2019.

*Primary Examiner* — Pinping Sun
(74) *Attorney, Agent, or Firm* — Downs Rachlin Martin PLLC

(57) ABSTRACT

The invention relates to a filter circuit arrangement, an electric vehicle and a method of operating an electric vehicle, comprising a rectifier-sided high voltage terminal and a rectifier-sided low voltage terminal, a network-sided high voltage terminal and a network-sided low voltage terminal, a vehicle ground connecting terminal, a first virtual ground circuit section, wherein the electrical connection of the network-sided high voltage terminal to the rectifier-sided high voltage terminal comprises at least one filter element of at least one filter circuit and the electrical connection of the network-sided high voltage terminal to the first virtual ground section comprises at least a first resistive element, wherein the electrical connection of the network-sided low voltage terminal to the rectifier-sided low voltage terminal comprises at least one filter element of at least one filter
(Continued)

Figure 1:
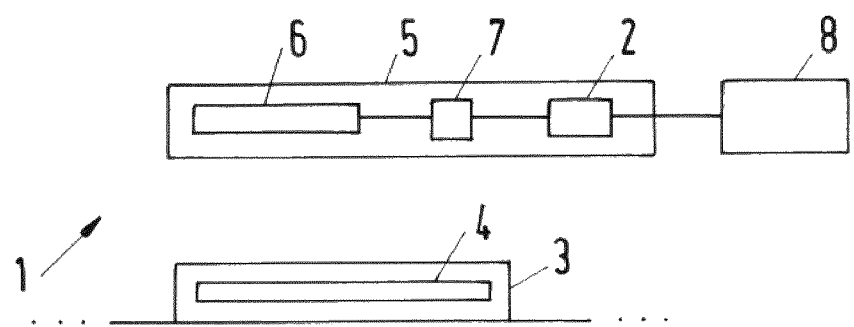

circuit and the electrical connection of the network-sided low voltage terminal to the first virtual ground section comprises at least a second resistive element, wherein the electrical connection of the first virtual ground section to the vehicle ground connecting terminal comprises at least a first capacitive element.

10 Claims, 2 Drawing Sheets

(58) Field of Classification Search
CPC ......... B60L 2240/527; B60L 2240/529; B60L 2270/147; B60L 2270/20; B60L 3/0061; B60L 53/20; H02J 50/12; H02M 1/126; H02M 1/14; H02M 1/143; H02M 1/15; Y02T 10/70; Y02T 10/7072; Y02T 90/14; H03H 7/06; H03H 7/1741

See application file for complete search history.

(56) References Cited

U.S. PATENT DOCUMENTS

| | | | |
|---|---|---|---|
| 2012/0068655 A1 | 3/2012 | Inuduka et al. | |
| 2014/0139167 A1* | 5/2014 | Steimer | H02M 1/126 318/494 |
| 2015/0171889 A1* | 6/2015 | Melanson | H03M 3/424 341/110 |
| 2015/0318834 A1* | 11/2015 | Wu | H03H 7/427 333/181 |
| 2018/0118040 A1* | 5/2018 | Kim | B60L 50/51 |

FOREIGN PATENT DOCUMENTS

| | | | | |
|---|---|---|---|---|
| EP | 3071440 A1 | | 9/2016 | |
| JP | 2001069762 A | * | 3/2001 | H02M 1/126 |
| JP | 2014-72966 A | | 4/2014 | |
| JP | 2014135674 A | | 7/2014 | |
| WO | WO-2014096080 A2 | * | 6/2014 | B60L 11/182 |
| WO | 2015150297 A2 | | 10/2015 | |

* cited by examiner

FILTER CIRCUIT ARRANGEMENT, AN ELECTRIC VEHICLE AND A METHOD OF OPERATING AN ELECTRIC VEHICLE

The invention relates to a filter circuit arrangement for connecting a vehicle-sided rectifier of a system of inductive power transfer to a traction network of the vehicle. Further, the invention relates to an electric vehicle and a method of operating the electric vehicle.

Electric vehicles, in particular a track-bound vehicle, and/or a road automobile, can be operated by electric energy which is transferred by means of an inductive power transfer. Such a vehicle may comprise a circuit arrangement, which can be a traction system or a part of a traction system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a traction battery or to operate an electric machine. In the latter case, the DC can be converted into an AC by means of an inverter.

The inductive power transfer is performed using two sets of winding structures. A first set is installed on the ground (primary winding structures) and can be fed by a wayside power converter (WPC). The second set of windings (secondary winding structures) is installed on the vehicle. For example, the second set of windings can be attached underneath the vehicle, in the case of trams under some of its wagons. For an automobile it can be attached to the vehicle chassis. The secondary winding structure(s) or, generally, the secondary side is often referred to as pick-up-arrangement or onboard receiving unit or is a part thereof. The primary winding structure(s) and the secondary winding structure(s) form a high frequency transformer to transfer electric energy to the vehicle. This can be done in a static state (when there is no movement of the vehicle) and in a dynamic state (when the vehicle moves). The rectifier is electrically connected to the secondary winding structure and is operated in order to rectify the alternating voltage provided by the secondary winding structure during inductive power transfer. It is known that the operation of the rectifier generates an undesired noise which can e.g. cause voltage ripples in the rectified output signal.

WO 2015/150297 A2 discloses a receiving device of a system for inductive power transfer to a vehicle, wherein the receiving device comprises a housing and a rectifier.

US2015/318834 A1 discloses a common mode noise reduction circuit and, more particularly, to a common mode noise reduction circuit for suppressing common mode noise while maintaining the differential mode signals with minimum loss.

JP 2014135674 A discloses a common mode filter.

Further, a traction network of the vehicle to which the rectifier is connected can also generate or transfer noise to the rectifier. This noise can e.g. be due to an operation of electrical components connected to the traction network, e.g. electric machines or other supporting systems such as an air conditioning system.

The secondary unit which is also referred to onboard receiving unit (ORU) has to meet strict regulatory requirements for noise, in particular for radiated and conducted radio frequency noise. Of particular concern are the frequency ranges used for vehicle assistance communications such as key codes, CAN, and In-Car-Entertainment systems such as the commercial radio bands used for DAB, FM, LW and MW. In addition, it is desired to isolate a high voltage output of the ORU from the ground.

As mentioned before, the radiated and conducted noise arises from a variety of sources, both within the ORU and from vehicle assistance systems connected to the ORU, i.e. the aforementioned components connected to the traction network. This noise may take the form of a so-called common mode noise, i.e. noise in the same direction along both high voltage power lines and opposite with respect to ground, or of a so-called differential mode noise, i.e. noise in opposing directions on each high voltage power line, or so-called mixed mode, a complex combination of both modes with respect to ground.

One or multiple of the following noise sources may exist:

First, noise sources of the traction network, e.g. the hybrid motor drives on the vehicle or the air conditioning systems which generate low frequency noise, e.g. in the range of 10 kHz to 100 kHz, generate primarily differential conducted noise entering the ORU high voltage circuit. This noise must not be radiated from the front face of the ORU or transferred to the low voltage circuit as common mode noise. It is desired that the ORU does not provide a low impedance differential path for this noise to prevent heating of internal components caused by large current flows at these frequencies.

High frequency mixed mode, common or differential conducted noise present on the high voltage system of the vehicle, i.e. the traction network, from the various hybrid system components provide further noise. It is desired that such noise is not radiated from the front face of the ORU or transferred to the low voltage circuit as common mode noise.

A further noise source results from magnetic and capacitive coupling from the primary unit to the ORU during charging, e.g. in the range of 85 kHz to 255 kHz. This noise is primarily radiated common mode noise, wherein it is not desired to pass this noise into the vehicle systems as conducted common mode noise at the high voltage power connections.

A further source of low frequency noise at e.g. 170 kHz results from power transfer. This noise is primarily due to the current and voltage ripples on the high voltage output from the ORU caused by the rectification of the alternating voltage provided by the secondary winding structure. This noise is primarily differential mode conducted noise present at the high voltage connections.

A high frequency noise from 1 MHz upwards results from fast switching of the power rectifiers and the voltage change at the output of the secondary winding structure. This noise is primarily present as mixed mode, differential mode or common mode conducted noise at the high voltage connecting terminals or radiated noise from the face of the ORU.

There is the technical problem of providing a filter circuit arrangement of a system of inductive power transfer to a vehicle, an electric vehicle and a method of operating an electric vehicle which allow an effective filtering of noise generated by the rectifier and/or vehicle components. A further technical problem is to provide this effective filtering with building space requirements and/or costs as small as possible.

The solution to said technical problem is provided by the subject-matter with the features of claims 1, 8 and 9. Further advantageous embodiments of the invention are provided by the subject-matter with the features of the sub claims.

A resonant filter circuit arrangement for connecting a vehicle-sided rectifier of a system of inductive power transfer to a traction network of the vehicle is proposed. The filter circuit arrangement is a passive circuit arrangement, i.e. a circuit arrangement comprising only passive electrical elements.

The present invention can be applied to any land vehicle (including, but not preferably, any vehicle which is only temporarily on land), in particular track-bound vehicles, such as rail vehicles (e.g. trams), but also to road automobiles, such as individual (private) passenger cars or public transport vehicles (e.g. busses including trolley busses which are also track-bound vehicles).

In the following, an electric element can denote a resistive element, a capacitive element or an inductive element. An exemplary resistive element is a resistor. An exemplary capacitive element is a capacitor. An exemplary inductive element is a coil.

The filter circuit arrangement comprises a rectifier-sided high voltage terminal and a rectifier-sided low voltage terminal. By said terminals, the filter circuit arrangement can be electrically connected to a high voltage output terminal of the rectifier and a low voltage output terminal of the rectifier, wherein a DC (direct voltage) is provided at these output terminals.

Further, the circuit arrangement comprises a network-sided high voltage terminal and a network-sided low voltage terminal. By means of said terminals, the circuit arrangement can be electrically connected to a high voltage input terminal of the traction network and a low voltage input terminal of the traction network.

The traction network can comprise a so-called traction battery of the vehicle. Further, the traction network can comprise other electrical components of the vehicle, e.g. an electric machine for propelling the vehicle, power converters or other electrical components, e.g. components of an air conditioning system of the vehicle.

Further, the filter circuit arrangement comprises a vehicle ground connecting terminal for electrically connecting the circuit arrangement to the vehicle ground potential. The vehicle ground potential can denote a reference potential of the vehicle. In particular, the vehicle ground potential can be a potential of a vehicle chassis. It is, however, of course possible that the vehicle ground potential is provided by another reference potential of the vehicle.

Further, the circuit arrangement comprises or provides a first virtual ground circuit section. The first virtual ground circuit section provides a so-called first virtual ground potential. The first virtual ground potential is different from the vehicle ground potential. In particular, the first virtual ground potential can be a floating ground or floating ground potential.

Further, the electrical connection of the network-sided high voltage terminal to the rectifier-sided high voltage terminal comprises at least one filter element of at least one filter circuit. It is possible that said electrical connection comprises multiple filter elements of one filter circuit or multiple filter elements of multiple filter circuits. A filter element can be an electric element. In particular, a filter element can denote a capacitive element or an inductive element, or a combination thereof.

Further, the electrical connection of the network-sided high voltage terminal to the first virtual ground section comprises at least a first resistive element. Further, the electrical connection of the rectifier-sided high voltage terminal to the first virtual ground section can also comprise the first resistive element.

Further, the electrical connection of the network-sided low voltage terminal to the rectifier-sided low voltage terminal comprises at least one filter element of at least one filter circuit. It is possible that said electrical connection comprises multiple filter elements of one filter circuit or multiple filter elements of multiple filter circuits. Further, the electrical connection of the network-sided low voltage terminal to the first virtual ground section comprises at least a second resistive element. Further, the electrical connection of the rectifier-sided low voltage terminal to the first virtual ground section can also comprise the second resistive element.

Preferably, a resistance of the first resistive element is equal to a resistance of the second resistive element. It is, however, also possible (but not preferred) that a resistance of the first resistive element is smaller than or higher than resistance of the second resistive element.

Further, the electrical connection of the first virtual ground section to the vehicle ground connecting terminal can comprise at least a first capacitive element.

By providing the first and second resistive element and the first virtual ground section in addition to the filter element(s) of one or more filter circuits between the rectifier-sided terminals and the network-sided terminals, a so-called false ground or false reference potential can be provided. This false reference potential is in particular provided by at the circuit section by which the two resistive elements are connected. Providing said false reference potential advantageously allows to reduce a voltage rating of the filter elements used in the proposed circuit arrangement. This is in particular possible since the voltage to which the filter elements are exposed is limited to a fraction of the maximum voltage falling across the rectifier-sided high voltage terminal and the rectifier-sided low voltage terminal or the network-sided high voltage terminal and the network-sided low voltage terminal, wherein the fraction depends on the resistance ratio of the first and second resistive elements. This consequently allows to use cheaper electric elements and electric elements with small building space requirements.

Further, the filter elements allow an effective and reliable filtering of the aforementioned noises, in particular the suppression of common mode noise, differential mode noise and mixed-mode noise as well as the suppression of noise and ripples generated by the rectifier during operation. In particular, noise with predetermined frequencies can be reduced as much as possible.

In other words, the filter circuit arrangement provides a complex filter means for filtering the aforementioned noises which are transmitted between rectifier and traction network.

Further, the electrical connection of the first virtual ground section to the vehicle ground connecting terminal comprises at least a first capacitive element.

Providing the first capacitive element within the electrical connection between the first virtual ground section and the vehicle ground connecting terminal advantageously provides a bypass for common mode noise to the vehicle reference potential.

According to the invention, the electrical connection of the network-sided high voltage terminal to the first virtual ground section comprises at least one resonant filter circuit. Alternatively or in addition, the electrical connection of the network-sided low voltage terminal to the first virtual ground section comprises at least one resonant filter circuit. The resonant filter circuit can be tuned to a desired frequency. This means that electrical properties of filter elements, e.g. a resistance, a capacitance or an inductance, of elements of the resonant filter circuit are chosen such that the resonant frequency of the resonant filter circuit matches a predetermined frequency or frequencies which do not deviate more than a predetermined amount therefrom.

It is possible that the resonant frequency of the resonant filter circuit within the electrical connection of the network-sided high voltage terminal to the first virtual ground section is equal to the resonant frequency of the resonant filter circuit of the electrical connection of the network-sided low voltage terminal to the first virtual ground section. A resonant filter circuit can comprise at least capacitive element and at least inductive element. The resonant filter circuit within the electrical connection of the network-sided high voltage terminal to the first virtual ground section can comprise at the least one filter element which is part of the electrical connection of the network-sided high voltage terminal to the rectifier-sided high voltage terminal. Such an element can preferably be an inductive element. Correspondingly, at least one filter element of the at least one resonant filter circuit of the electrical connection of the network-sided low voltage terminal to the first virtual ground section can comprise at the least one filter element of the electrical connection of the network-sided low voltage terminal to the rectifier-sided low voltage terminal. This element can also be an inductive element.

A resonant filter circuit can e.g. be designed as a notch filter circuit. A notch filter effectively suppresses only a single frequency or a very narrow range of frequencies, wherein remaining frequencies are not or only minimally affected.

Providing a resonant filter circuit advantageously allows to provide a very effective suppression of voltage ripples which are caused by the operation of the rectifier. A further advantage is a reduction of the size and the cost of the aforementioned filter circuit arrangement.

In another embodiment, the arrangement comprises or provides a further virtual ground section, wherein an electrical connection of the further virtual ground section and the first virtual ground section comprises at least one resistive element. In particular, a potential of the first virtual ground section can be different, e.g. higher lower than or lower than a potential of the further virtual ground section. The at least one resistive element which is part of the electrical connection of the further virtual ground section to the first virtual ground section can also be referred to as balancing resistor. Such a resistive element advantageously provides a DC (direct current) path to the first virtual ground section which allows or simplifies to ensure that nodes of the filter circuit arrangement operate within the voltage ratings of the various circuit elements.

In another embodiment, the electrical connection of the further virtual ground section to the vehicle ground terminal comprises at least a second capacitive element. A capacitance of the second capacitive element can be different, in particular higher than or lower than, the capacitance of the first capacitive element which electrically connects the vehicle ground potential to the first virtual ground section.

Providing such a connecting capacitive element between the further virtual ground section and the vehicle ground terminal advantageously allows to tune a further resonant filter circuit within the electrical connection of the network-sided high voltage terminal to the further virtual ground section and/or the electrical connection of the network-sided low voltage terminal to the further virtual ground section to a desired predetermined resonant frequency which can in particular be different from the resonant frequency of the resonant filter circuits provided in the aforementioned electrical connection of the network-sided high voltage terminal to the first virtual ground section and/or the electrical connection of the network-sided low voltage terminal to the first virtual ground section. Providing such (a) further resonant filter circuit(s) advantageously with said second capacitive element allows to improve suppression of voltage ripples which are caused by the operation of the rectifier and also allows to reduce building space requirements and costs of the filter circuit arrangement. In other words, there is the possibility of providing notch filters with different center frequency. This advantageously allows to suppress different frequencies effectively, in particular as much as possible.

In another embodiment, the electrical connection of the network-sided high voltage terminal to the further virtual ground section comprises at least one resonant filter circuit, e.g. a further resonant filter circuit. Alternatively or preferably in addition, the electrical connection of the network-sided low voltage terminal to the further virtual ground section comprises at least one resonant filter circuit, e.g. a further resonant filter circuit. Such a filter circuit can in particular be designed in a similar fashion as the aforementioned resonant filter circuit which connects the respective network-sided terminal to the first virtual ground section.

In such an arrangement, a two-stage filter circuit is provided by which different frequencies can effectively be suppressed. It is e.g. possible that a resonant frequency of the resonant filter circuits by which the network-sided high voltage terminal is connected to the first and the further virtual ground section are different from one another. Correspondingly, it is possible that a resonant frequency of the resonant filter circuits by which the network-sided low voltage terminal is connected to the first and the further virtual ground section are different from one another. It is, however, also possible to provide these resonant filter circuits with equal resonant frequencies.

In another embodiment, the resonant filter circuit comprises a series connection of an inductive element and a capacitive element. Providing a resonant filter circuit as said series connection advantageously allows to tune the desired filter performance, in particular the suppression of common mode noise, differential mode noise and mixed-mode noise as well as the suppression of noise and ripples generated by the rectifier during operation, to (a) specific predetermined frequency/frequencies or a specific, predetermined range of frequencies.

It is possible that the electrical connection of the network-sided high voltage terminal to the rectifier-sided high voltage terminal comprises at least one filter element, in particular an inductive filter element, of the resonant filter circuit connecting the network-sided high voltage terminal to the first virtual ground section and at least one filter element, in particular an inductive filter element, of the resonant filter circuit connecting the rectifier-sided high voltage terminal to the further virtual ground section. It is in particular possible that these filter elements can be connected in series.

Correspondingly, the electrical connection of the network-sided low voltage terminal to the rectifier-sided low voltage terminal comprises at least one filter element, in particular an inductive filter element, of the resonant filter circuit connecting the network-sided low voltage terminal to the first virtual ground section and at least one filter element, in particular an inductive filter element, of the resonant filter circuit connecting the rectifier-sided low voltage terminal to the further virtual ground section. It is in particular possible that these filter elements can be connected in series.

In another embodiment, the electrical connection of the rectifier-sided high voltage terminal to the first or a further virtual ground section comprises at least one resonant filter circuit. Again, it is possible that at least one filter element of said resonant filter circuit provides a filter element which is arranged within the electrical connection of the network-sided high voltage terminal to the rectifier-sided high voltage terminal.

Alternatively or, preferably, in addition, the electrical connection of the rectifier-sided low voltage terminal to the first or a further virtual ground section comprises at least one resonant filter circuit. Again, it is possible that at least one filter element of said resonant filter circuit provides a filter element which is arranged within the electrical connection of the network-sided low voltage terminal to the rectifier-sided low voltage terminal.

It is possible that the electrical connection of the rectifier-sided high voltage terminal to the first virtual ground section or to the further virtual ground section comprises further electric elements, in particular further filter elements. It is in particular possible that the electrical connection comprises further filter elements of one of the aforementioned resonant filter circuits between the network-sided high voltage terminal to the first virtual ground section or to the further virtual ground section. It is further possible that the electrical connection of the rectifier-sided high voltage terminal to the first virtual ground section or to the further virtual ground section comprises further electric elements, in particular capacitive elements, which do not provide filter elements.

Correspondingly, it is possible that the electrical connection of the rectifier-sided low voltage terminal to the first virtual ground section or to the further virtual ground section comprises further electric elements, in particular further filter elements. It is in particular possible that the electrical connection comprises further filter elements of one of the aforementioned resonant filter circuits between the network-sided low voltage terminal to the first virtual ground section or to the further virtual ground section. It is further possible that the electrical connection of the rectifier-sided low voltage terminal to the first virtual ground section or to the further virtual ground section comprises further electric elements, in particular capacitive elements, which do not provide filter elements.

Further proposed is an electric vehicle. The electric vehicle can comprise an ORU. Further, the electric vehicle can comprise a traction network. Further, the electric vehicle can comprise components electrically connected to the traction network or being part of the traction network, e.g. electric machine and/or a traction battery. Further, the electric vehicle comprises a filter circuit arrangement according to one of the embodiments disclosed herein. Further, an electric connection of a rectifier of a secondary unit, i.e. the ORU, of a system for inductive power transfer to the traction network of the electric vehicle comprises said filter circuit arrangement. This advantageously allows providing a vehicle in which noises in both directions is effectively reduced.

Further proposed is a method of operating an electric vehicle according to one of the embodiments disclosed herein. Within this method, energy is inductively transferred to the vehicle.

Figure 2:
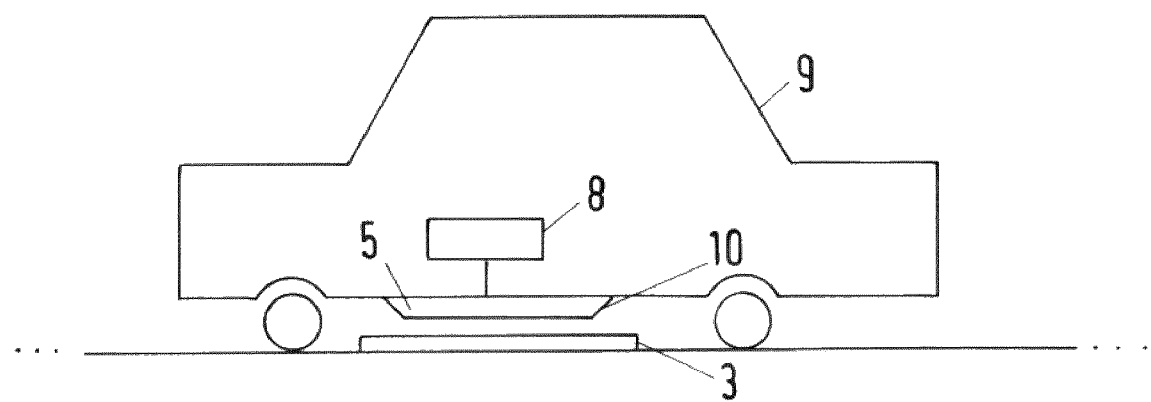
Figure 3:
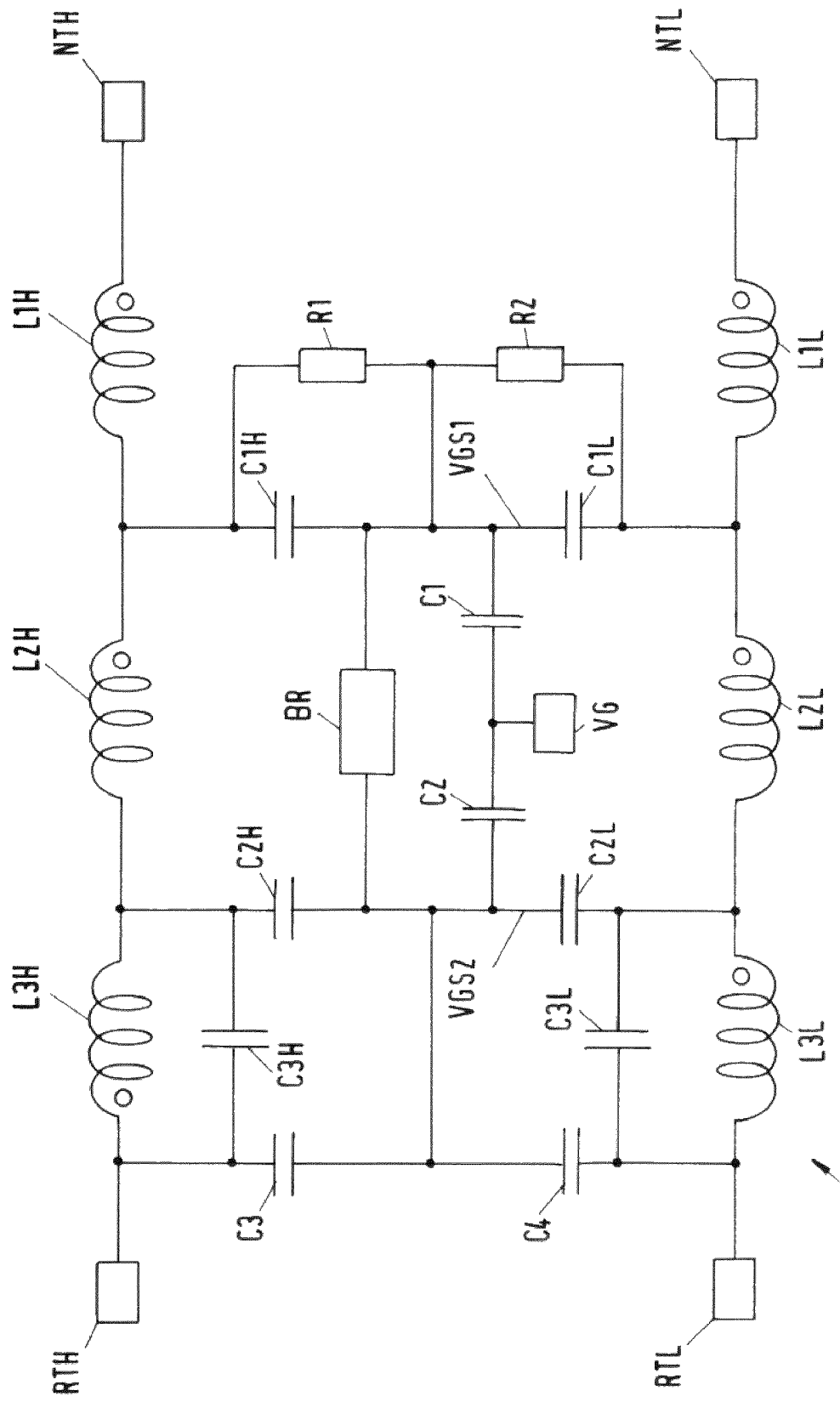

The invention will be described with reference to the attached figures. The figures show:

FIG. 1 a schematic block diagram of a system for inductive power transfer with a filter circuit arrangement according to the invention, FIG. 2 a schematic view on an electric vehicle according to the invention and FIG. 3 a schematic circuit diagram of a filter circuit arrangement according to the invention.

In the following, the same reference numerals denote same or similar technical features.

FIG. 1 shows a schematic block diagram of a system for inductive power transfer 1 with a filter circuit arrangement 2 according to the invention. The system 1 for inductive power transfer comprises a primary unit 3 with a primary winding structure 4 for generating an electromagnetic power transfer field. The primary unit 3 can e.g. be installed on a surface of a route or on a wall, e.g. of a garage. Further, the system 1 comprises a secondary unit 5 which can be also referred to as onboard receiving unit (ORU). The secondary unit 5 comprises a secondary winding structure 6 for receiving the power transfer field generated by the primary winding structure 4. Further, the secondary unit 5 comprises a rectifier 7 for rectifying the alternating voltage provided by the secondary winding structure during the reception of said power transfer field. Further shown is a filter circuit arrangement 2 for connecting the vehicle-sided rectifier 7 of the system 1 to a traction network 8 of a vehicle 9 (see FIG. 2). The filter circuit arrangement 2 can be part of the secondary unit 5. It is e.g. possible that the filter circuit arrangement 2 is arranged within a housing 10 of the secondary unit 5, e.g. the housing in which the secondary winding structure 6 and/or the rectifier 7 is arranged. It is, however, also possible that the filter circuit arrangement 2 is arranged outside said housing 10.

The filter circuit arrangement 2 is used to filter the aforementioned noise signals, in particular the so-called common mode noise, the so-called differential mode noise and the so-called mixed mode noise. Further, the filter circuit arrangement 2 is used to filter ripples generated by the switching elements (not shown) of the rectifier 7 during the switching operations required for the rectification of the alternating voltage provided by the secondary winding structure 6.

FIG. 2 shows a schematic electric vehicle 9 with a secondary unit 5 which is also shown in FIG. 1. It is shown that the secondary unit 5 is arranged at a bottom side of the vehicle 9. Further shown is a primary unit 3 (see FIG. 1). Further shown is the traction network 8 of the electric vehicle 9. In said electric vehicle 9, the secondary winding structure 6 is connected to the traction network 8 by means of the rectifier 7 and the filter circuit arrangement 2 (see FIG. 1). Vice versa, traction network 8 is connected to the secondary winding structure 6 by means of the filter circuit arrangement 2 and the rectifier 7. This means that a transmission of noise signals to the traction network 8, e.g. ripples or other undesired signal portions generated by the secondary winding structure 6 and/or by the rectifier 7, is suppressed and does not affect an operation of the traction network 8 or electric components connected to the traction network 8 in an undesired way. Further, the transmission of noise signals generated within the traction network 8, e.g. by components connected to the traction network 8, to the secondary winding structure 6 is suppressed and will not cause an undesired signal emission from the secondary winding structure 6.

FIG. 3 shows a schematic circuit diagram of a filter circuit arrangement 2 according to the invention. The filter circuit arrangement 2 comprises a rectifier-sided high voltage terminal RTH and a rectifier-sided low voltage terminal RTL. Further, the filter circuit arrangement 2 comprises a network-sided high voltage terminal NTH and a network-sided low voltage terminal NTL.

Further, the filter circuit arrangement 2 comprises a vehicle ground connecting terminal VG.

Further, the filter circuit arrangement 2 comprises or provides a so-called first virtual ground section VGS1.

The electric connection of the network-sided high voltage terminal NTH to the rectifier-sided high voltage terminal RTH comprises at least one filter element of at least one filter circuit. In the embodiment shown, said electrical connection comprises a first high voltage inductive element L1H, a second high voltage inductive element L2H and a third high voltage inductive element L3H, wherein said inductive elements L1H, L2H, L3H can e.g. be provided by coils respectively. The term high voltage is only chosen for terminology purposes and does not denote a specific electrical characteristic of the respective element. Correspondingly, the term low voltage is only chosen for terminology purposes and does not denote a specific electrical characteristic of the respective element.

These inductive elements L1H, L2H, L3H of said electrical connection provide elements of a first high voltage filter circuit, a second high voltage filter circuit and a third high voltage filter circuit which will be explained in the following.

Correspondingly, the electrical connection of the network-sided low voltage terminal NTL to the rectifier-sided low voltage terminal RTL comprises at least one filter element of at least one filter circuit, namely a first low voltage inductive element L1L, a second low voltage inductive element L2L and a third low voltage inductive filter element L3L. These inductive elements L1HL, L2L, L3L of said electrical connection provide elements of a first low voltage filter circuit, a second low voltage filter circuit and a third low voltage filter circuit which will be explained in the following.

Further, the electrical connection of the network-sided high voltage terminal NTH to the first virtual ground section VGS1 comprises at least a first resistive element R1. Correspondingly, the electrical connection of the network-sided low voltage terminal NTL to the first virtual ground section VGS1 comprises a second resistive element R2. Resistive elements R1, R2 and the context of this invention can e.g. be provided by resistors. A resistance of the first and the second resistive element R1, R2 can e.g. be equal.

It is further shown that electrical connection of the network-sided high voltage terminal NTH to the first virtual ground section VGS1 comprises a first high voltage capacitive element C1H and the electrical connection of the network-sided low voltage terminal NTL to the first virtual ground section VGS1 comprises a first low voltage capacitive element C1L.

The first high voltage capacitive element C1*h* is electrically arranged in parallel to the first resistive element R1. Correspondingly, the first low voltage capacitive element C1L is arranged electrically in parallel to the second resistive element R2. A capacitance of said first high and low voltage capacitive elements C1*h*. C1I can be equal.

Within the electrical connection of the network-sided high voltage terminal NTH to the first virtual ground section VGS1, the parallel connection of the first resistive element R1 and the first high voltage capacitive element C1H is electrically connected in series with the first high voltage inductive element L1H. Thus, the circuit arrangement 2 comprises also a series connection of the first high voltage inductive element L1H and the first capacitive element C1H within electrical connection of the network-sided high voltage terminal NTH to the first virtual ground section VGS1. This series connection provides a first high voltage filter circuit.

Correspondingly, the parallel arrangement of the second resistive element R2 and the first low voltage capacitive element C1L is electrically connected in series to the first low voltage inductive element L1L within the electrical connection of the network-sided low voltage terminal NTL to the first virtual ground section VGS1. Thus, the circuit arrangement 2 also comprises a series connection of the first low voltage inductive element L1L and the first low voltage capacitive element C1L which provides a first low voltage filter circuit.

The first high voltage filter circuit and the first low voltage filter circuit are provided by resonant filter circuits, e.g. series resonant filter circuits.

Further, the electrical connection of the first virtual ground section VGS1 to the vehicle ground connecting terminal VG comprises at least a first capacitive element C1. The vehicle ground connecting terminal VG denotes a terminal providing a reference potential of the vehicle, e.g. a potential of the vehicle chassis.

Further shown is that the filter circuit arrangement 2 comprises a further virtual ground section VGS2. An electrical connection between the first and the further virtual ground section VGS1, VGS2 comprises at least one resistive element BR which can also be referred to as balancing resistor. Further shown is that the electrical connection between the further virtual ground section VGS2 and the vehicle ground connecting terminal VG comprises a second capacitive element C2. A capacitance of the first and the second capacitive element C1, C2 can be different from one another.

Further shown is that the electrical connection of the network-sided high voltage terminal NTH to the further virtual ground section VGS2 comprises a second high voltage capacitive element C2H. In particular, said electrical connection comprises a series connection of the second high voltage inductive element L2H and the second high voltage capacitive element C2H. This series connection provides a second high voltage filter circuit which is designed as a second resonant filter circuit. More particular, the electrical connection of the network-sided high voltage terminal NTH to the further virtual ground section VGS2 comprises a series connection of the first high voltage inductive element L1H, the second low voltage inductive element L2H and the second high voltage capacitive element C2H.

Correspondingly, the electrical connection of the network-sided low voltage terminal NTL to the further virtual ground section VGS2 comprises a second low voltage capacitive element C2L. In particular, said electrical connection comprises a series connection of the second low voltage inductive element L2L and the second low voltage capacitive element C2L. This series connection provides a second low voltage filter circuit which is designed as a second resonant filter circuit. More particular, the electrical connection of the network-sided low voltage terminal NTL to the further virtual ground section VGS2 comprises a series connection of the first low voltage inductive element L1L, the second low voltage inductive element L2L and the second low voltage capacitive element C2L.

It is further shown that the electrical connection of the rectifier-sided high voltage terminal RTH to the further virtual ground section VGS2 comprises a third capacitive element C3. Further, said electrical connection comprises the aforementioned second high voltage capacitive element C2H and a parallel connection of the third high voltage inductive element L3H and a third high voltage capacitive element C3H. In particular, a series connection of the second high voltage capacitive element C2H and the aforementioned parallel connection of the third high voltage inductive element L3H and the third high voltage capacitive element C3H is electrically arranged in parallel to the third capacitive element C3 and provides the electrical connection of the rectifier-sided high voltage terminal RTH to the further virtual ground section VGS2. The parallel connection of the third high voltage inductive element L3H and the third high voltage capacitive element C3H provides a third high voltage filter circuit, i.e. a resonant filter circuit which is designed as a parallel resonant filter circuit.

Correspondingly, the electrical connection of the rectifier-sided low voltage terminal RTL to the further virtual ground section VGS2 comprises a fourth capacitive element C4. Further, said electrical connection comprises the aforementioned second low voltage capacitive element C2L and a parallel connection of the third low voltage inductive element L3L and a third low voltage capacitive element C3L. In particular, a series connection of the second low voltage capacitive element C2L and the aforementioned parallel connection of the third low voltage inductive element L3L and the third low voltage capacitive element C3L is electrically arranged in parallel to the fourth capacitive element C4 and provides the electrical connection of the rectifier-sided low voltage terminal RTL to the further virtual ground section VGS2. The parallel connection of the third low voltage inductive element L3L and the third low voltage capacitive element C3L provides a third low voltage filter circuit, i.e. a resonant filter circuit which is designed as a parallel resonant filter circuit.

In other words, the electrical connection of the network-sided high voltage terminal NTH to the rectifier-sided high voltage terminal RTH comprises a series connection of the first, the second and the third high voltage inductive elements L1H, L2H, L3H. Further, the electrical connection of the network-sided low voltage terminal NTL to the rectifier-sided low voltage terminal RTL comprises a series connection of the first, the second and the third low voltage inductive elements L1L, L2L, L3L.

It is further indicated that coils providing the first high voltage inductive element L1H and the first low voltage inductive element L1L are wound in the same direction with respect to a current flowing from the respective network-sided voltage terminal NTH, NTL to the first virtual ground section VGS1. It is further indicated that coils providing the second high voltage inductive element L2H and the second low voltage inductive element L2L are wound in the same direction with respect to a current flowing from the respective network-sided voltage terminal NTH, NTL to the further virtual ground section VGS2. It is further indicated that coils providing the third high voltage inductive element L3H and the third low voltage inductive element L3L are wound in the opposite directions with respect to a current flowing from the respective rectifier-sided voltage terminal RTH, RTL to the further virtual ground section VGS2.

By means of the first and the second high and low voltage filter circuits, common mode noise and differential mode noise generated within the traction network 8 (see FIG. 1) can be suppressed. By means of the third filter circuits, ripples generated by the operation of the rectifier can be suppressed.

The invention claimed is:

1. A filter circuit arrangement for connecting a vehicle-sided rectifier of a system of inductive power transfer to a traction network of a vehicle comprising:
a rectifier-sided first voltage terminal and a rectifier-sided second voltage terminal, wherein, during operation, the rectifier-sided second voltage terminal is at a voltage lower than the rectifier-sided first voltage terminal;
a network-sided first voltage terminal and a network-sided second voltage terminal, wherein, during the operation, the network-sided second voltage terminal is at a voltage lower than the network-sided first voltage terminal;
a vehicle ground connecting terminal; and
a first virtual ground circuit section;
wherein an electrical connection of the network-sided first voltage terminal to the rectifier-sided first voltage terminal comprises at least one filter element of at least one filter circuit and an electrical connection of the network-sided first voltage terminal to the first virtual ground section comprises at least a first resistive element, wherein an electrical connection of the network-sided second voltage terminal to the rectifier-sided second voltage terminal comprises at least one further filter element of at least one second filter circuit and an electrical connection of the network-sided second voltage terminal to the first virtual ground section comprises at least a second resistive element, wherein an electrical connection of the first virtual ground section to the vehicle ground connecting terminal comprises at least a first capacitive element;
characterized in that an electrical connection of the network-sided first voltage terminal to the first virtual ground section comprises at least one resonant filter circuit and/or in that an electrical connection of the network-sided second voltage terminal to the first virtual ground section comprises at least one another resonant filter circuit.

2. The filter circuit arrangement of claim 1, characterized in that the arrangement comprises a further virtual ground section, wherein an electrical connection of the further virtual ground section and the first virtual ground section comprises at least one resistive element.

3. The filter circuit arrangement of claim 2, characterized in that an electrical connection of the further virtual ground section to the vehicle ground terminal comprises at least a second capacitive element.

4. The filter circuit arrangement of claim 2, characterized in that an electrical connection of the network-sided first voltage terminal to the further virtual ground section comprises at least one second resonant filter circuit and/or in that an electrical connection of the network-sided second voltage terminal to the further virtual ground section comprises at least one second another resonant filter circuit.

5. The filter circuit arrangement of claim 1, characterized in that the resonant filter circuit comprises a series connection of an inductive element and a capacitive element.

6. The filter circuit arrangement of claim 1, characterized in that an electrical connection of the rectifier-sided first voltage terminal to the first or a further virtual ground section comprises at least one second resonant filter circuit and/or in that an electrical connection of the rectifier-sided second voltage terminal to the first or the further virtual ground section comprises at least one second another resonant filter circuit.

7. The filter circuit arrangement of claim 6, characterized in that the resonant filter circuit comprises a parallel connection of an inductive element and a capacitive element.

8. The filter circuit arrangement of claim 1, characterized in that an electrical connection of the rectifier-sided first voltage terminal to the first or a further virtual ground section comprises at least one second capacitive element and/or in that an electrical connection of the rectifier-sided second voltage terminal to the first or the further virtual ground section comprises at least one third capacitive element.

9. An electric vehicle comprising the filter circuit arrangement according to claim 1, wherein an electric connection of the vehicle-side rectifier of a secondary unit of the system for inductive power transfer to the traction network of the electric vehicle comprises the filter circuit arrangement.

10. A method of operating the electric vehicle according to claim 9, wherein energy is inductively transferred to the electric vehicle.

* * * * *